US011632831B2

(12) United States Patent
Ishimaru

(10) Patent No.: US 11,632,831 B2
(45) Date of Patent: Apr. 18, 2023

(54) INTEGRATED CIRCUIT DEVICE AND LIGHT SOURCE DEVICE

(71) Applicant: Seiko Epson Corporation, Tokyo (JP)

(72) Inventor: Kei Ishimaru, Chino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/582,362

(22) Filed: Jan. 24, 2022

(65) Prior Publication Data

US 2022/0240357 A1    Jul. 28, 2022

(30) Foreign Application Priority Data

Jan. 25, 2021   (JP) .............................. JP2021-009263

(51) Int. Cl.
  *H05B 45/10*    (2020.01)
  *H05B 45/3725*  (2020.01)
  *H05B 45/325*   (2020.01)

(52) U.S. Cl.
  CPC ........... *H05B 45/10* (2020.01); *H05B 45/325* (2020.01); *H05B 45/3725* (2020.01)

(58) Field of Classification Search
  CPC .. H05B 45/10; H05B 45/325; H05B 45/3725; Y02B 20/30
  See application file for complete search history.

(56) References Cited

U.S. PATENT DOCUMENTS

| 10,362,645 | B1* | 7/2019 | Ke ...................... H05B 45/3725 |
| 2018/0267395 | A1 | 9/2018 | Yamada |
| 2019/0110349 | A1* | 4/2019 | Tsukahara .......... G03B 21/2033 |
| 2020/0077479 | A1* | 3/2020 | DeJonge ................ H05B 45/37 |
| 2020/0264501 | A1* | 8/2020 | Ishimaru ............... H01S 5/0428 |

FOREIGN PATENT DOCUMENTS

| JP | 2018-152318 A | 9/2018 |
| JP | 2019-071269 A | 5/2019 |
| JP | 2019-129080 A | 8/2019 |

* cited by examiner

*Primary Examiner* — Minh D A
(74) *Attorney, Agent, or Firm* — Harness, Dickey & Pierce, P.L.C.

(57) ABSTRACT

The integrated circuit device includes a drive circuit and a regulator. The drive circuit outputs a drive signal to a switching element. A source power supply voltage the same in potential as a source voltage of a transistor as the switching element is input to the regulator, and the regulator generates a gate power supply voltage based on the source power supply voltage. The drive circuit has a level shifter for level-shifting a PWM signal based on the gate power supply voltage and the source power supply voltage. The drive circuit outputs the drive signal based on an output signal of the level shifter to the gate of the transistor.

8 Claims, 13 Drawing Sheets

INTEGRATED CIRCUIT DEVICE AND LIGHT SOURCE DEVICE

The present application is based on, and claims priority from JP Application Serial Number 2021-009263, filed Jan. 25, 2021, the disclosure of which is hereby incorporated by reference herein in its entirety.

BACKGROUND

1. Technical Field

The present disclosure relates to an integrated circuit device, a light source device, and so on.

2. Related Art

In JP-A-2019-71269 (Document 1), there is disclosed a light source device including a light emitting element, an N-type transistor, and an inductor disposed in series between a power supply and a ground, and a light emission control circuit for performing switching control on the N-type transistor with a PWM signal to be input from outside. As shown in FIG. 21 of Document 1, external components such as a capacitor and a diode are disposed between the gate and the source of the N-type transistor so that the N-type transistor is appropriately controlled between ON and OFF.

The external components described above are necessary for the N-type transistor to appropriately be controlled between ON and OFF on the one hand, but are mounted on a circuit board of the light source device as discrete components, and therefore, increase the area or a cost of the circuit board on the other hand. As described above, there is a problem that it is not possible to achieve both of reduction of the external components and the appropriate ON/OFF control of the N-type transistor.

SUMMARY

An aspect of the present disclosure relates to an integrated circuit device configured to control a switching element disposed at a cathode side of a light emitting element in series with the light emitting element between a power supply node and one end of an inductor, the integrated circuit device including a drive circuit configured to output a drive signal to the switching element, and set the drive signal to an active state to thereby set the switching element to an ON state, and set the drive signal to an inactive state to thereby set the switching element to an OFF state, and a regulator to which a source power supply voltage same in potential as a source voltage of a transistor as the switching element is input, and which is configured to generate a gate power supply voltage based on the source power supply voltage, wherein the drive circuit has a level shifter configured to level-shift a PWM signal based on the gate power supply voltage and the source power supply voltage, and outputs the drive signal based on an output signal of the level shifter to a gate of the transistor.

Another aspect of the present disclosure relates to a light source device including the integrated circuit device described above, the light emitting element, the switching element, and the inductor.

DESCRIPTION OF AN EXEMPLARY EMBODIMENT

A preferred embodiment of the present disclosure will hereinafter be described in detail. It should be noted that the present embodiment described hereinafter does not unreasonably limit the content as set forth in the appended claims, and all of the constituents described in the present embodiment are not necessarily essential constituents.

1. Regarding External Components

Figure 1:
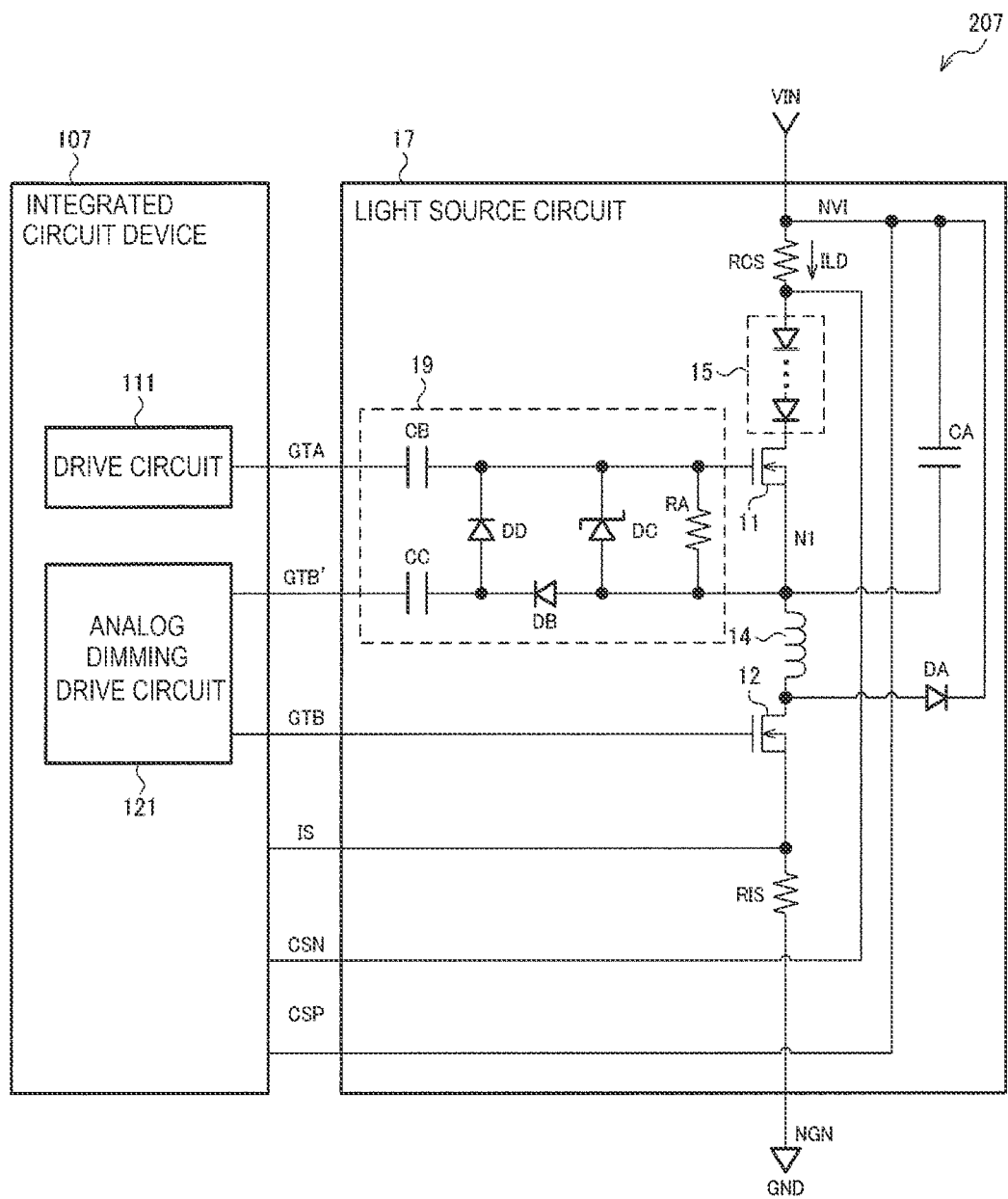
FIG. 1 is a diagram showing a configuration example of a light source device when using external components.

FIG. 1 shows a configuration example of a light source device 207 when using external components. The light source device 207 includes an integrated circuit device 107 and a light source circuit 17. Circuit elements constituting the light source circuit 17 are discrete components, and these discrete components are mounted on a circuit board together with the integrated circuit device 107.

The light source circuit 17 includes a switching element 11, an analog dimming switching element 12, an inductor 14, a light emitting element 15, resistors RCS, RIS, a capacitor CA, and a diode DA. The integrated circuit device 107 includes a drive circuit 111 and an analog dimming drive circuit 121.

The switching element 11 and the analog dimming switching element 12 are each an N-type transistor. The light emitting element 15 is driven by a current ILD, and emits light with the luminance corresponding to the current value of the current ILD. The light emitting element 15 is formed of a plurality of laser diodes coupled in series to each other. It should be noted that the light emitting element 15 can be a single laser diode, or can also be an LED (Light Emitting Diode).

The light emitting element 15 and the switching element 11 are disposed in series between a power supply node NVI and a first node N1. The power supply node NVI is a node to which an input power supply voltage VIN is input. The first node N1 is the source of the N-type transistor as the switching element 11, and is coupled to one end of the inductor 14. The inductor 14, the analog dimming switching element 12, and the resistor RIS are disposed in series between the first node N1 and a ground node NGN. The ground node NGN is a node to which a ground voltage GND is input. The capacitor CA is disposed between the power supply node NVI and the first node N1. The diode DA is disposed between the power supply node NVI and the other end of the inductor 14.

The drive circuit 111 outputs a drive signal GTA to thereby control the switching element 11 between ON and OFF. The analog dimming drive circuit 121 outputs an analog dimming drive signal GTB to thereby control the analog dimming switching element 12 between ON and OFF. The analog dimming drive circuit 121 performs switching regulation control of keeping the current ILD flowing through the light emitting element 15 constant based on voltages CSP, CSN at both ends of the resistor RCS and a voltage IS at one end of the resistor RIS. As a dimming mode, there are cited, for example, an analog dimming mode and a PWM dimming mode. In the analog dimming mode, the switching element 11 is always in an ON state, and an amount of light emitted by the light emitting element 15 is controlled by the switching regulation control of the analog dimming switching element 12. Further, in the PWM dimming mode, the amount of light emitted by the light emitting element 15 is kept constant by performing the switching regulation control on the analog dimming switching element 12 in a period in which the switching element 11 is in the ON state, and the amount of the light emitted by the light emitting element 15 is controlled by an ON-duty when the switching element 11 is switched between ON and OFF.

In the analog dimming mode, the drive signal GTA is at a high level, and further, when the ON-duty is relatively long in the PWM dimming mode, the drive signal GTA is kept at the high level for a long time. In such a case, in order to appropriately control a gate voltage of the switching element 11, the light source circuit 17 includes capacitors CB, CC, diodes DB, DD, a zener diodes DC, and a resistor RA as an external component group 19.

The resistor RA and the zener diode DC are disposed for protecting the switching element 11. The first node N1 as the source of the switching element 11 is set at a voltage corresponding to a current flowing through the inductor 14, but is not set at the ground voltage. Therefore, the drive signal GTA based on the ground voltage is AC-coupled with the capacitor CB, and is then input to the gate of the switching element 11. On this occasion, when the drive signal GTA is kept at the high level for a long time, the gate-source voltage of the switching element 11 decreases due to the resistor RA, and the switching element 11 is set in an OFF state.

In order to cope with the above, there are disposed the diodes DB, DD and the capacitor CC. By the analog dimming drive circuit 121 outputting a signal GTB' substantially the same as the analog dimming drive signal GTB for the switching regulation to one end of the capacitor CC, a voltage at the other end of the capacitor CC varies based on a source voltage of the switching element 11, and by the voltage being transmitted to the gate of the switching element 11 with the diode DD, pumping of the gate voltage of the switching element 11 is performed.

As described hereinabove, the external component group 19 is disposed so that the switching element 11 is unintentionally set to the OFF state, but the external component group 19 is mounted on a circuit board of the light source device 207 as discrete components, and therefore, increases the area or the cost of the circuit board. Therefore, it is desired to reduce the external components while achieving a configuration in which the switching element 11 is not unintentionally set to the OFF state.

2. Light Source Device

Figure 2:
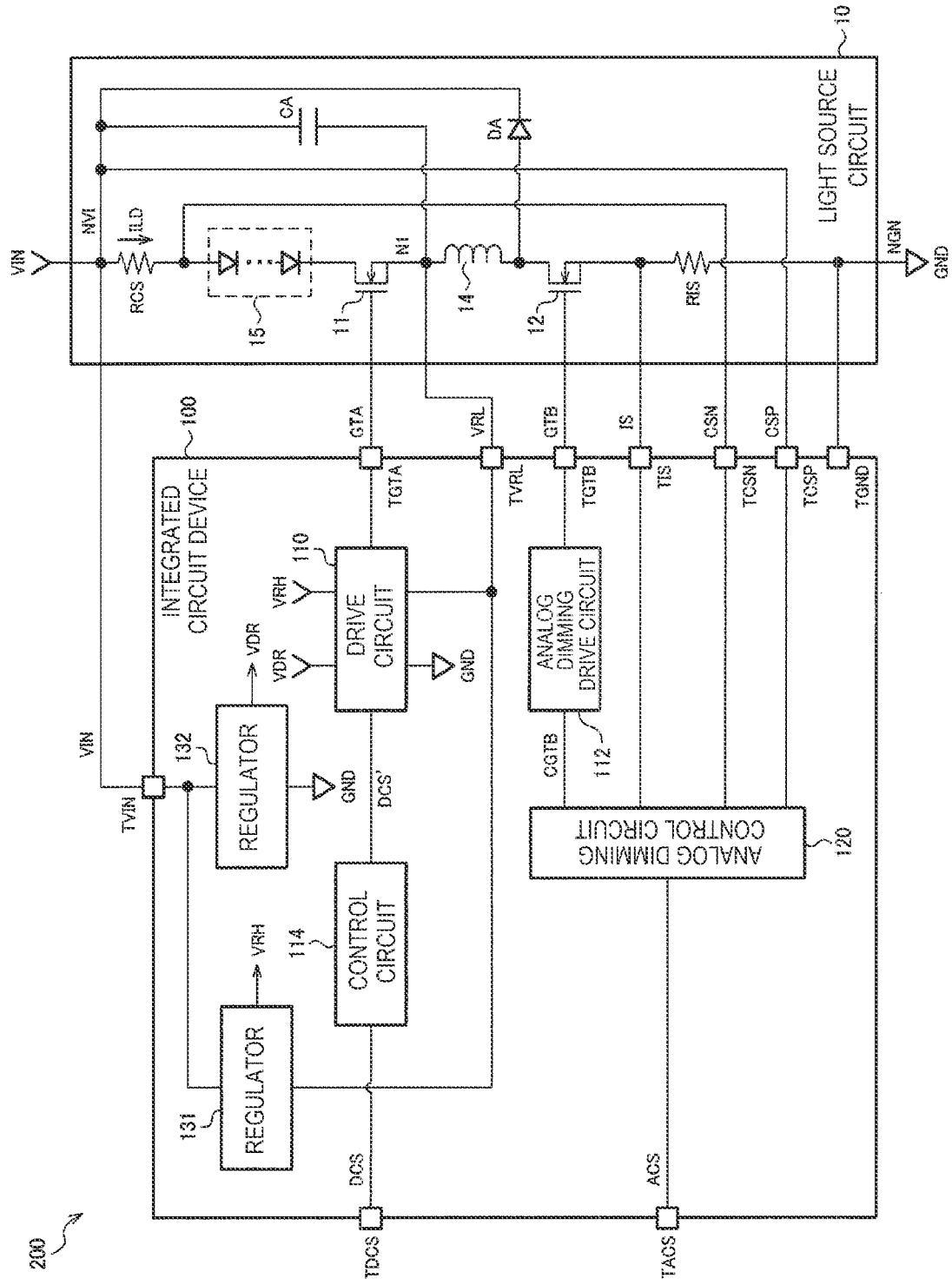
FIG. 2 is a diagram showing a configuration example of the light source device.

FIG. 2 shows a configuration example of a light source device 200 in the present embodiment. The light source device 200 includes an integrated circuit device 100 and a light source circuit 10. It should be noted that the integrated circuit device 100 is also called a light emission control device.

The light source circuit 17 includes the switching element 11, the analog dimming switching element 12, the inductor 14, the light emitting element 15, the resistors RCS, RIS, the capacitor CA, and the diode DA. The integrated circuit device 107 includes the drive circuit 111 and the analog dimming drive circuit 121. The coupling relationship between the circuit elements is as described with reference to FIG. 1, but the external component group 19 is omitted in the present embodiment. It should be noted that an example in which the switching element 11 is the N-type transistor is described in FIG. 2, but the switching element 11 can be a PMOS transistor. The configuration example of the light source circuit and the integrated circuit device in that case will be described later.

The integrated circuit device 100 includes a drive circuit 110, an analog dimming drive circuit 112, a control circuit 114, an analog dimming control circuit 120, regulators 131, 132, a PWM terminal TDCS, a dimming voltage input terminal TACS, and terminals TVIN, TGTA, TVRL, TGTB, TIS, TCSP, TCSN, and TGND. The regulator 131 is also referred to as a first regulator, and the regulator 132 is also referred to as a second regulator. Each of the terminals is a pad provided to a semiconductor substrate of the integrated circuit device or a terminal of a package for housing the semiconductor substrate.

The terminal TVRL is coupled to the source of the switching element 11 without being AC-coupled, and a source power supply voltage VRL the same in potential as a source voltage of the switching element 11 is input to the terminal TVRL. From the power supply circuit disposed outside the integrated circuit device 100, the input power supply voltage VIN is input to the terminal TVIN, and the ground voltage GND is input to the terminal TGND. The regulator 131 generates a gate power supply voltage VRH a predetermined voltage higher than the source power supply voltage VRL using the source power supply voltage VRL and the input power supply voltage VIN. It should be noted that although an example in which the source voltage of the switching element 11 is input to the regulator 131 as the source power supply voltage VRL is shown here, it is possible for the source voltage of the switching element 11 to be buffered and then input to the regulator 131 as the source power supply voltage as described later.

The regulator 132 regulates the input power supply voltage VIN into a power supply voltage VDR. The power supply voltage VDR is a voltage based on the ground voltage GND, and is, for example, a voltage lower than the source power supply voltage VRL. The regulator 132 is a linear regulator using, for example, an operational amplifier and a resistor.

The terminal TGTA is coupled to the gate of the switching element 11 without being AC-coupled. The drive circuit 110 has a level shifter for level-shifting a PWM signal DCS'. The drive circuit 110 outputs the drive signal GTA on which the level-shift has been performed to the gate of the switching element 11 via the terminal TGTA. It should be noted that although a detailed configuration example of the drive circuit 110 will be described later, it is possible for the drive circuit 110 to output an output signal of the level shifter directly as the drive signal GTA, or to buffer the output signal of the level shifter and then output the result as the drive signal GTA. The low level of the PWM signal DCS' is the ground voltage GND, and the high level thereof is a power supply voltage of the control circuit 114. The low level of the drive signal GTA on which the level-shift has been performed is the source power supply voltage VRL, and the high level thereof is the gate power supply voltage VRH. When the switching element 11 is the N-type transistor, since the switching element 11 is set to the ON state when the drive signal GTA is at the high level, the high level corresponds to an active state, and the low level corresponds to an inactive state.

In the present embodiment described hereinabove, the integrated circuit device 100 controls the switching element 11. The switching element 11 is disposed at the cathode side of the light emitting element 15 in series with the light emitting element 15 between the power supply node NVI and the one end of the inductor 14. The integrated circuit device 100 includes the drive circuit 110 and the regulator 131. The drive circuit 110 outputs the drive signal GTA to the switching element 11, and sets the drive signal GTA to the active state to thereby set the switching element 11 to the ON state, and sets the drive signal GTA to the inactive state to thereby set the switching element 11 to the OFF state. The source power supply voltage VRL the same in potential as the source voltage of a transistor as the switching element 11 is input to the regulator 131, and the regulator 131 generates the gate power supply voltage VRH based on the source power supply voltage VRL. The drive circuit 110 has the level shifter for level-shifting the PWM signal DCS' based on the gate power supply voltage VRH and the source power supply voltage VRL. The drive circuit 110 outputs the drive signal GTA based on an output signal of the level shifter to the gate of the transistor.

According to the present embodiment, the low level of the drive signal GTA to be input to the gate of the switching element 11 becomes the source power supply voltage VRL, and the high level thereof becomes the gate power supply voltage VRH based on the source power supply voltage VRL. Thus, the switching element 11 is appropriately controlled between ON and OFF even when inputting the drive signal GTA to the gate of the switching element 11 without the AC coupling. In other words, it becomes possible to appropriately control the switching element 11 between ON and OFF without disposing the external component group 19 of the light source circuit 17 shown in FIG. 1.

The configuration and the operation for reducing the external component group 19 are hereinabove described. A configuration and an operation related to the PWM dimming mode and the analog dimming mode of the light source device 200 will hereinafter be described.

A PWM signal DCS to be used for the dimming control in the PWM dimming mode is input to the PWM terminal TDCS from a processing device. A dimming voltage ACS to be used for the dimming control in the analog dimming mode is input to the dimming voltage input terminal TACS from the processing device. The processing device is a host device of the integrated circuit device 100, and is a processor such as an MPU or a CPU.

The control circuit 114 buffers the PWM signal DCS and then outputs the PWM signal DCS' having been buffered. The control circuit 114 is a logic circuit, and is a buffer circuit formed of, for example, an inverter. The drive circuit 110 outputs the drive signal GTA based on the PWM signal DCS' from the control circuit 114.

The analog dimming control circuit 120 outputs a control signal CGTB based on the dimming voltage ACS and the PWM signal DCS. The analog dimming control circuit 120 controls the analog dimming switching element 12 between ON and OFF in a period in which the PWM signal DCS is in the active state. Specifically, the voltage CSP of one end of the first resistor RCS is input to the terminal TCSP, the voltage CSN of the other end of the first resistor RCS is input to the terminal TCSN, and the voltage IS of one end of the second resistor RIS is input to the terminal TIS. The analog dimming control circuit 120 performs the switching regulation control on the current ILD flowing through the light emitting element 15 based on the voltages CSP, CSN, and IS and the dimming voltage ACS to thereby control the current ILD to correspond to the dimming voltage ACS.

The analog dimming drive circuit 112 is a driver for driving the analog dimming switching element 12. The analog dimming drive circuit 112 outputs the analog dimming drive signal GTB to the gate of the analog dimming switching element 12 via the terminal TGTB based on the control signal CGTB from the analog dimming control circuit 120. The analog dimming switching element 12 is in the ON state when the analog dimming drive signal GTB is in the active state, and is in the OFF state when the analog dimming drive signal GTB is in the inactive state. In the example shown in FIG. 2, the analog dimming switching element 12 is the N-type transistor, wherein the high level corresponds to the active state, and the low level corresponds to the inactive state.

Figure 3:
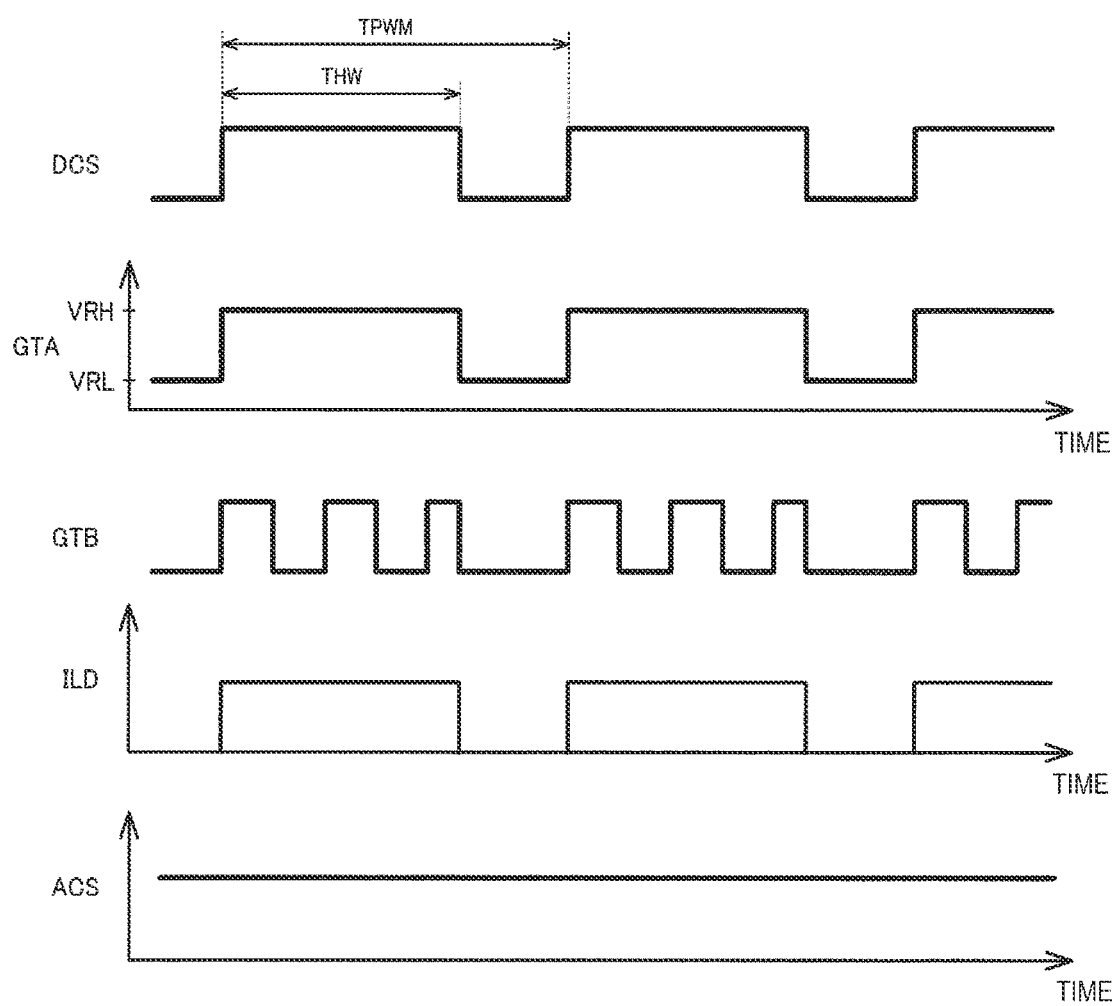
FIG. 3 is a chart showing a signal waveform example in a PWM dimming mode.

FIG. 3 shows a signal waveform example in the PWM dimming mode. The cycle length of the PWM signal DCS is denoted by TPWM, and the period in which the PWM signal DCS is at the high level is denoted by THW. The duty ratio of the PWM signal DCS is (THW/TPWM)×100%.

When the PWM signal DCS is at the high level, the drive circuit 110 outputs the drive signal GTA at the high level. In the present embodiment, the high level of the drive signal GTA is the gate power supply voltage VRH. Thus, the switching element 11 is set to the ON state. On this occasion, the analog dimming control circuit 120 and the analog dimming drive circuit 112 frequently switch the analog dimming switching element 12 to thereby perform the switching regulation control. Thus, the current ILD corresponding to the dimming voltage ACS flows through the light emitting element 15. When the PWM signal DCS is at the low level, the drive circuit 110 outputs the drive signal GTA at the low level. In the present embodiment, the low level of the drive signal GTA is the source power supply voltage VRL. Thus, the switching element 11 is set to the OFF state. Further, the analog dimming control circuit 120 and the analog dimming drive circuit 112 set the analog dimming switching element 12 to the OFF state. On this occasion, no current flows through the light emitting element 15. Since the time average of the current ILD flowing through the light emitting element 15 is determined by the duty ratio of the PWM signal DCS, the amount of light emitted is also determined by the duty ratio of the PWM signal DCS. As described above, in the PWM dimming mode, the dimming control is performed using the duty ratio of the PWM signal DCS.

It should be noted that in the analog dimming mode, the PWM signal DCS being normally at high level is input to the PWM terminal TDCS. The operation of the integrated circuit device 100 in the analog dimming mode is substantially the same as the operation of the integrated circuit device 100 when the PWM signal DCS is at the high level in the PWM dimming mode. In other words, in the analog dimming mode, since the current ILD corresponding to the dimming voltage ACS flows through the light emitting element 15, the dimming control is achieved by the dimming voltage ACS as a result.

In the present embodiment described hereinabove, the integrated circuit device 100 includes the analog dimming drive circuit 112. The analog dimming drive circuit 112 outputs the analog dimming drive signal GTB to the analog dimming switching element 12. The analog dimming switching element 12 controls the current flowing from the other end of the inductor 14 to the ground node NGN. In the period in which the drive signal GTA is in the active state, the analog dimming drive circuit 112 sets the analog dimming drive signal GTB to the active state to thereby set the analog dimming switching element 12 to the ON state, and sets the analog dimming drive signal GTB to the inactive state to thereby set the analog dimming switching element 12 to the OFF state.

According to the present embodiment, it is possible to realize the analog dimming mode in which the dimming is performed using the switching regulation control of the analog dimming drive circuit 112, and the PWM dimming mode in which the dimming is performed using the PWM drive of the drive circuit 110. In the analog dimming mode, or when the ON-duty is relatively long in the PWM dimming mode, the switching element 11 is kept in the ON state for a long time. However, according to the present embodiment, since the gate-source voltage of the switching element 11 does not lower, it is possible to appropriately control the switching element 11 between ON and OFF without disposing such an external component group 19 as described with reference to FIG. 1.

3. Detailed Configuration Example

Figure 4:
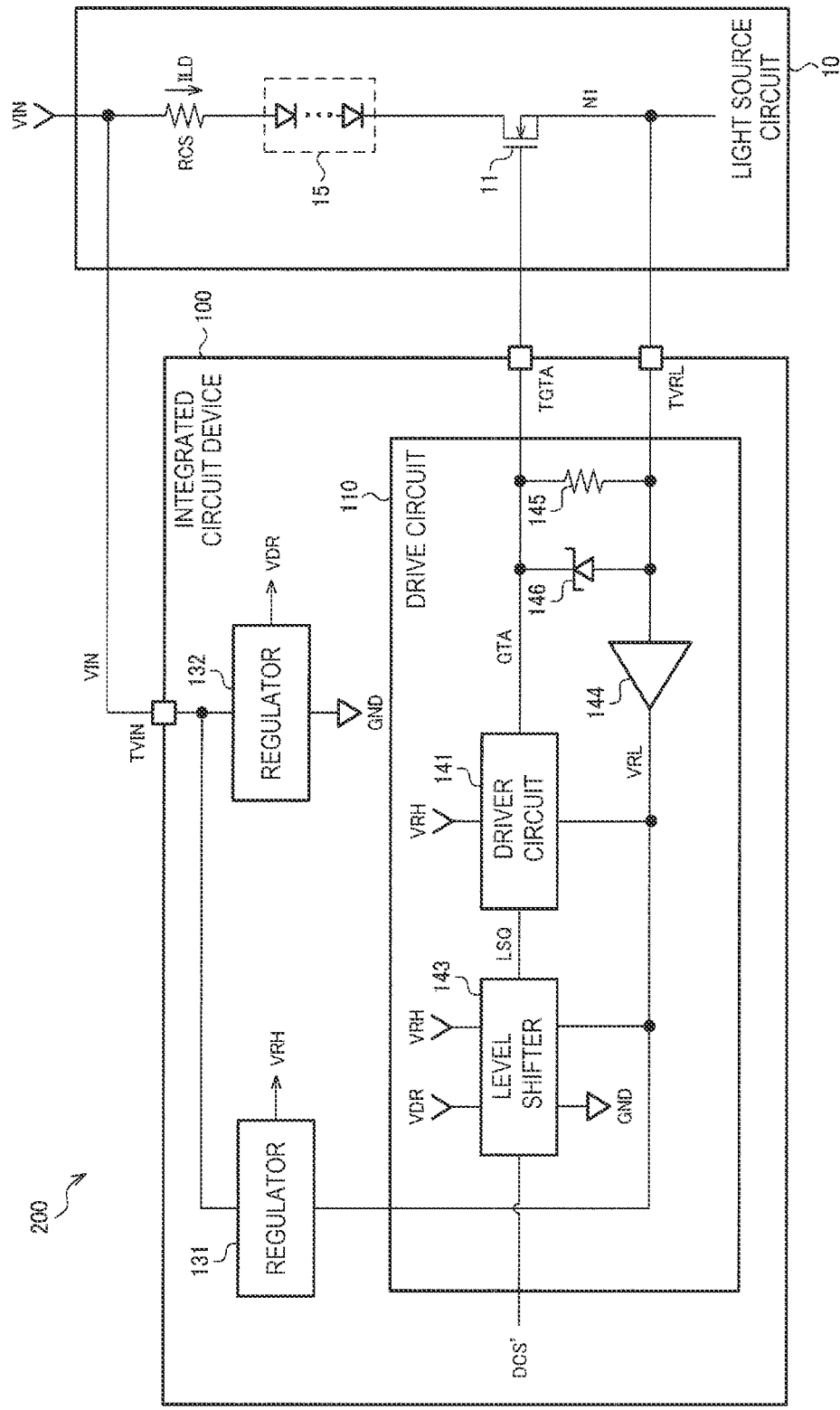
FIG. 4 is a diagram showing a first detailed configuration example of the light source device.

FIG. 4 shows a first detailed configuration example of the light source device 200. It should be noted that although some of the constituents shown in FIG. 2 are omitted in FIG. 4, those constituents are substantially the same as those shown in FIG. 2.

In the first detailed configuration example, the drive circuit 110 includes a driver circuit 141, a level shifter 143, a buffer amplifier circuit 144, a resistor 145, and a zener diode 146.

One end of the resistor 145 and the anode of the zener diode 146 are coupled to the terminal TGTA, and the other end of the resistor 145 and the cathode of the zener diode 146 are coupled to the terminal TVRL. The resistor 145 and the zener diode 146 are disposed as protective elements for the switching element 11. Specifically, the resistor 145 is disposed so as to set the gate-source voltage of the N-type transistor as the switching element 11 to 0 V to thereby set the switching element 11 to the OFF state when shutting down the integrated circuit device 100, and so on. Further, the zener diode 146 is disposed so that the gate-source voltage does not exceed a withstand voltage of the N-type transistor.

The buffer amplifier circuit 144 buffers the source voltage of the switching element 11, and then outputs the voltage thus buffered to the regulator 131 as the source power supply voltage VRL. The buffer amplifier circuit 144 is, for example, a voltage follower circuit.

The level shifter 143 receives the PWM signal DCS' to generate a signal the high level of which is the power supply voltage VDR, and the low level of which is the ground voltage GND, and then level-shifts the signal into an output signal LSQ the high level of which is the gate power supply voltage VRH, and the low level of which is the source power supply voltage VRL. It should be noted that although the low level of the PWM signal DCS' is the ground voltage GND, the high level thereof can be a voltage different from the power supply voltage VDR. The driver circuit 141 operates using the source power supply voltage VRL and the gate power supply voltage VRH as power supply voltages. The driver circuit 141 buffers the output signal LSQ, and then outputs the drive signal GTA thus buffered to the gate of the switching element 11 via the terminal TGTA.

Figure 5:
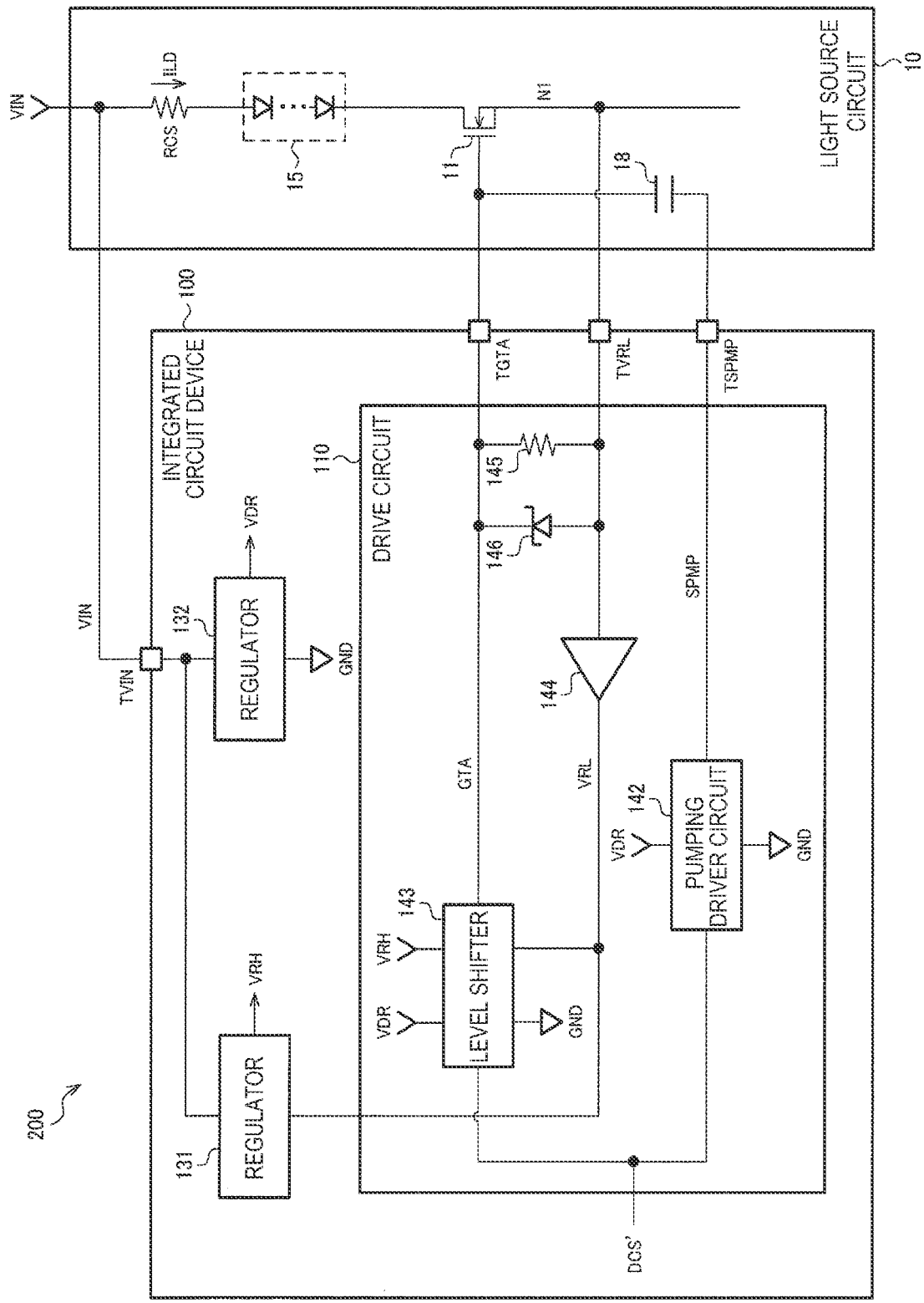
FIG. 5 is a diagram showing a second detailed configuration example of the light source device.

FIG. 5 shows a second detailed configuration example of the light source device 200. It should be noted that although some of the constituents shown in FIG. 2 are omitted in FIG. 5, those constituents are substantially the same as those shown in FIG. 2. It should be noted that the description regarding substantially the same portions as in the first detailed configuration example will arbitrarily be omitted.

In the second detailed configuration example, the integrated circuit device 100 includes a terminal TSPMP, and the light source circuit 10 includes a capacitor 18. The drive circuit 110 includes a pumping driver circuit 142, but does not include the driver circuit 141.

The level shifter 143 outputs an output signal thus level-shifted as the drive signal GTA. The drive signal GTA is output to the gate of the switching element 11 via the terminal TGTA.

One end of the capacitor 18 is coupled to the gate of the N-type transistor as the switching element 11, and the other end thereof is coupled to the terminal TSPMP. The pumping driver circuit 142 operates using the power supply voltage VDR and the ground voltage GND as the power supply. The pumping driver circuit 142 receives the PWM signal DCS' to generate a pumping drive signal SPMP the high level of which is the power supply voltage VDR, and the low level of which is the ground voltage GND. The pumping driver circuit 142 outputs the pumping drive signal SPMP to the other end of the capacitor 18 via the terminal TSPMP. The pumping drive signal SPMP is AC-coupled by the capacitor 18, and is then input to the gate of the switching element 11.

Figure 6:
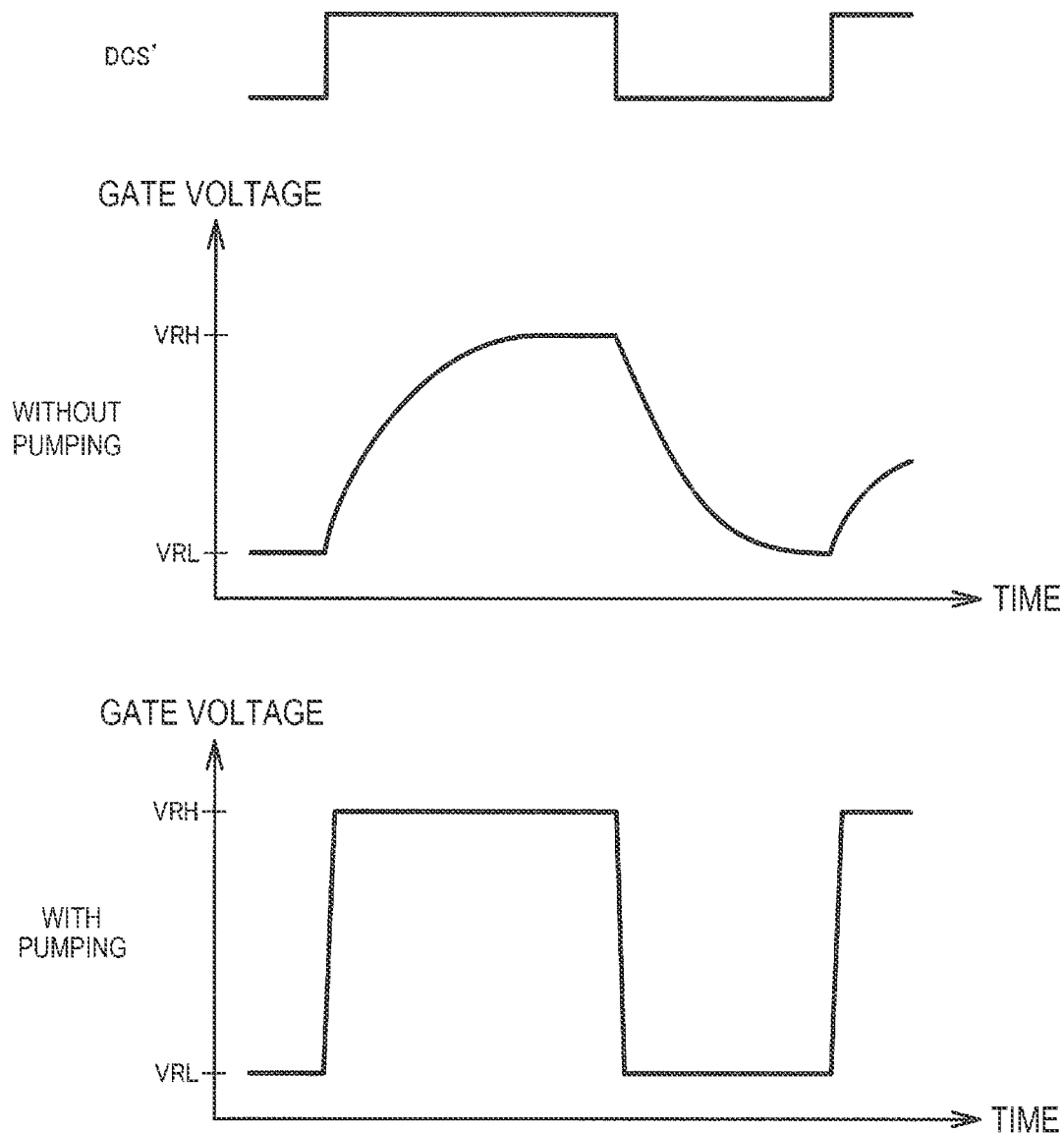
FIG. 6 is a diagram showing a signal waveform example in the second detailed configuration example.

FIG. 6 shows a signal waveform example in the second detailed configuration example. "WITHOUT PUMPING" represents a waveform of the gate voltage of the switching element 11 when the pumping driver circuit 142 is supposedly eliminated. "WITH PUMPING" represents a waveform of the gate voltage of the switching element 11 in the second detailed configuration example provided with the pumping driver circuit 142.

Since the voltage of the drive signal GTA is a relatively high voltage compared to the power supply voltage VDR and so on, the lower the drive power of the drive signal GTA the more preferable taking malfunction or breakage due to, for example, short circuit into consideration. In the present embodiment, the level shifter 143 directly drives the gate of the switching element 11 to thereby make the drive power low. However, since the drive power of the level shifter 143 is low, the waveform of the drive signal GTA dulls when supposedly eliminating the pumping driver circuit 142. Specifically, since the time from a rising edge of the PWM signal DCS' to when the gate voltage becomes the gate power supply voltage VRH is elongated, for example, the ON-duty of the switching element 11 becomes incorrect, and thus, it becomes unachievable to appropriately control the switching element 11 between ON and OFF.

In the second detailed configuration example, the pumping driver circuit 142 performs the pumping of the gate of the switching element 11 via the capacitor 18. Specifically, by the pumping driver circuit 142 changing the pumping drive signal SPMP from the ground voltage GND to the power supply voltage VDR, the gate of the switching element 11 rises from the source power supply voltage VRL as much as the power supply voltage VDR. Further, by the pumping driver circuit 142 changing the pumping drive signal SPMP from the power supply voltage VDR to the ground voltage GND, the gate of the switching element 11 falls from the gate power supply voltage VRH as much as the power supply voltage VDR. The power supply voltage VDR is set to a voltage of, for example, about a difference between the gate power supply voltage VRH and the source power supply voltage VRL.

Figure 7:
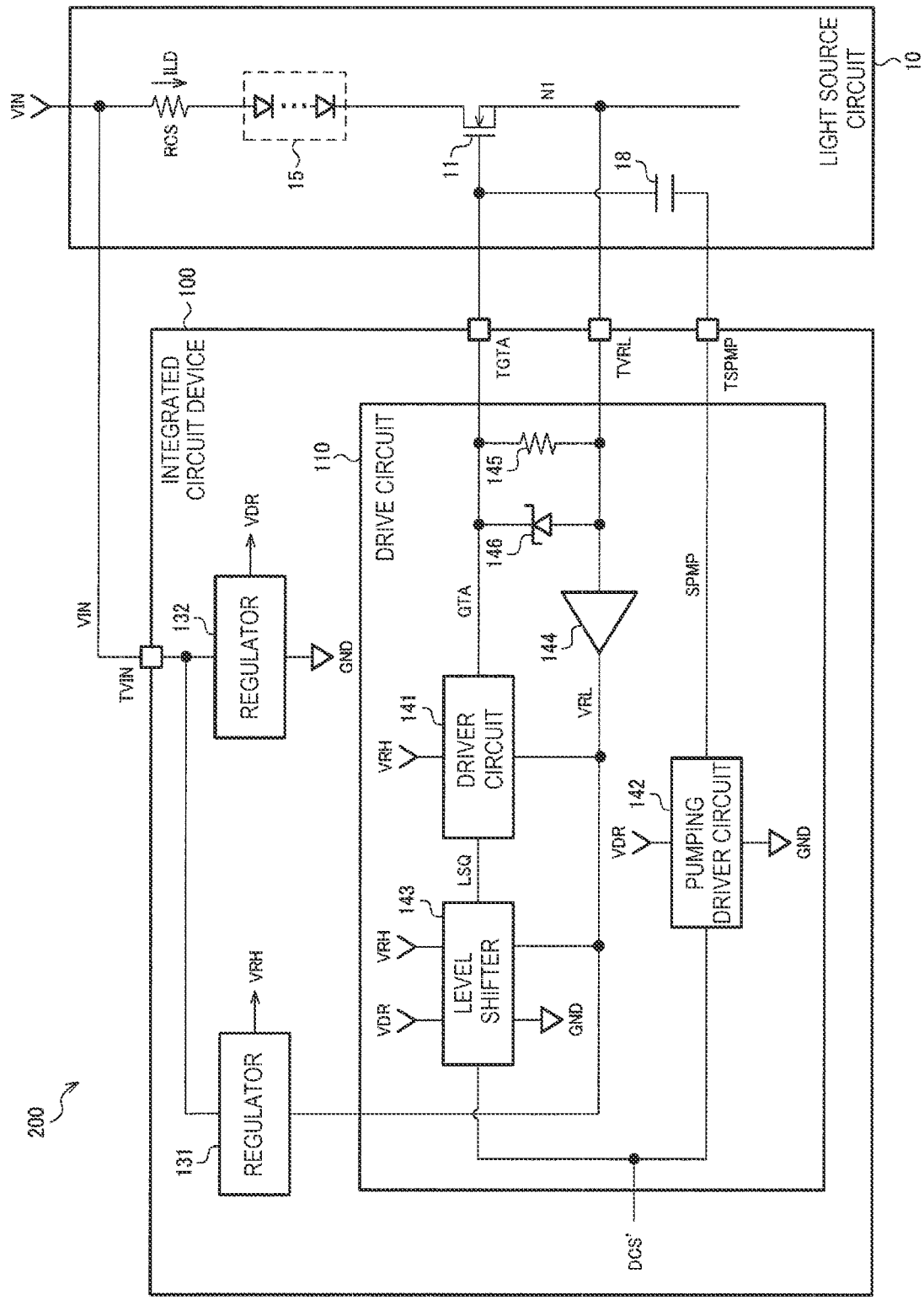
FIG. 7 is a diagram showing a third detailed configuration example of the light source device.

FIG. 7 shows a third detailed configuration example of the light source device 200. It should be noted that although some of the constituents shown in FIG. 2 are omitted in FIG. 7, those constituents are substantially the same as those shown in FIG. 2. It should be noted that the description regarding substantially the same portions as in the first detailed configuration example or the second detailed configuration example will arbitrarily be omitted.

In the third detailed configuration example, the drive circuit 110 further includes the driver circuit 141 compared to the second detailed configuration example. The driver circuit 141 higher in drive power than the level shifter 143 drives the gate of the switching element 11, and at the same time, the pumping driver circuit 142 performs the pumping of the gate of the switching element 11. Thus, the edge of the drive signal GTA changes more steeply.

Figure 8:
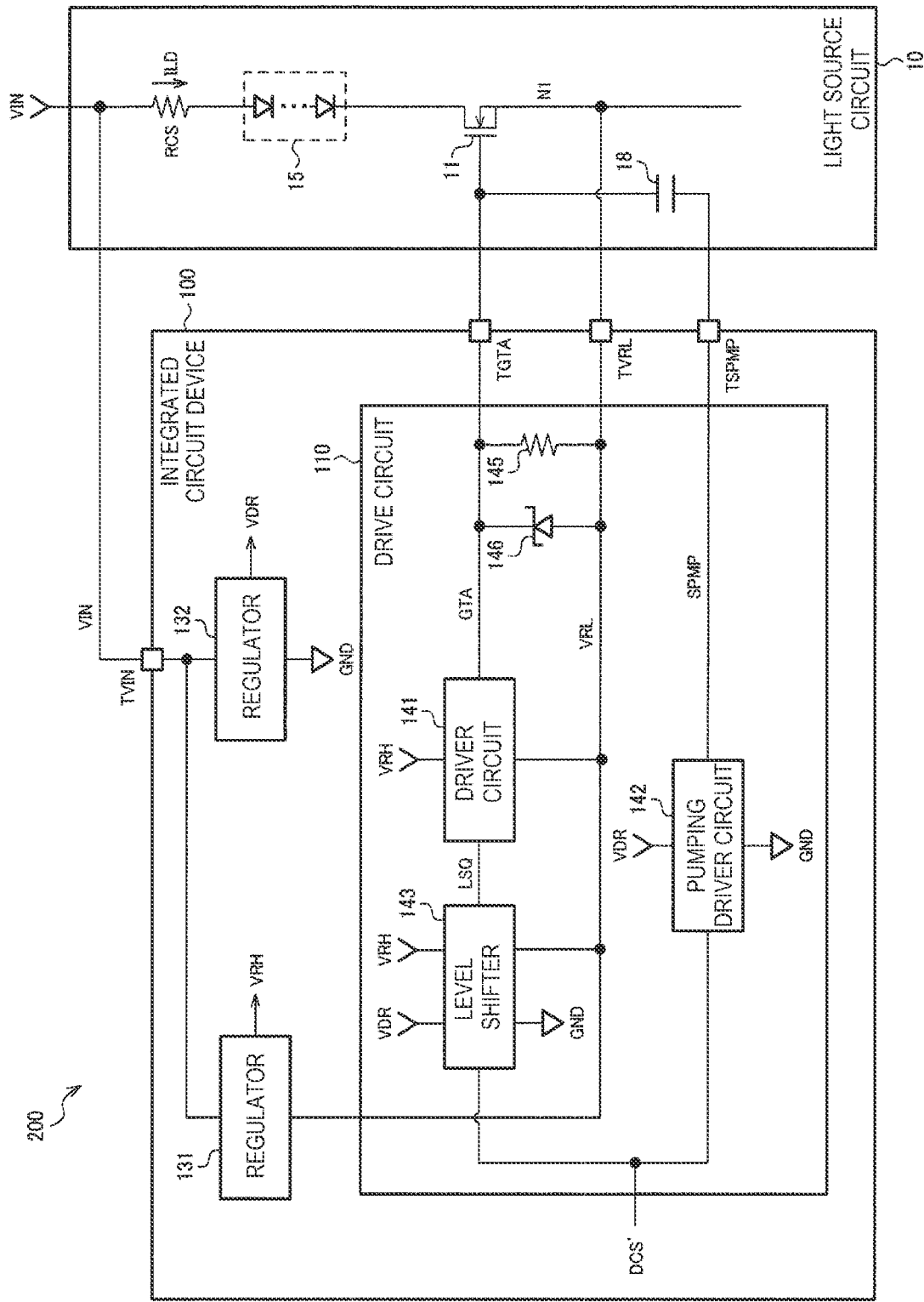
FIG. 8 is a diagram showing a fourth detailed configuration example of the light source device.

FIG. 8 shows a fourth detailed configuration example of the light source device 200. It should be noted that although some of the constituents shown in FIG. 2 are omitted in FIG. 8, those constituents are substantially the same as those shown in FIG. 2. It should be noted that the description regarding substantially the same portions as in the first detailed configuration example, the second detailed configuration example, or the third detailed configuration example will arbitrarily be omitted.

In the fourth detailed configuration example, the drive circuit 110 does not include the buffer amplifier circuit 144 compared to the third detailed configuration example. In other words, the source voltage input to the terminal TVRL is directly input to the regulator 131 as the source power supply voltage VRL. A consumption current with respect to the gate power supply voltage VRH flows through the inductor 14 via the regulator 131. However, since an amount of the current is in a degree of not significantly affecting the light emission control, it is possible to omit the buffer amplifier circuit 144.

It should be noted that it is possible to omit the buffer amplifier circuit 144 in the first detailed configuration example and the second detailed configuration example.

Figure 9:
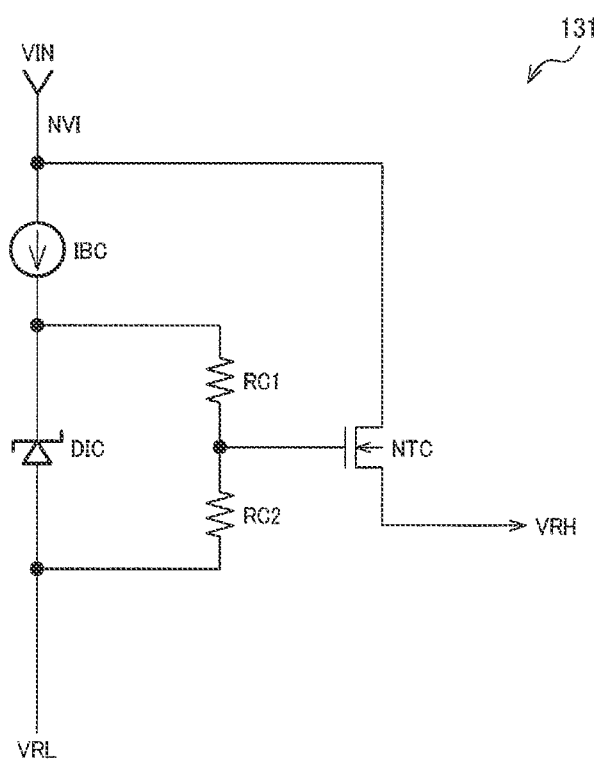
FIG. 9 is a diagram showing a detailed configuration example of a regulator.

FIG. 9 shows a detailed configuration example of the regulator 131. The regulator 131 includes a current source circuit IBC, a zener diode DIC, resistors RC1, RC2, and an N-type transistor NTC.

The current source circuit IBC is disposed between the power supply node NVI and the cathode of the zener diode DIC. The anode of the zener diode DIC is coupled to a node of the source power supply voltage VRL. By the current source circuit IBC making a current flow from the cathode to the anode of the zener diode DIC, the cathode of the zener diode DIC is set to a voltage obtained by adding a zener voltage to the source power supply voltage VRL.

The resistors RC1, RC2 are coupled in series between the cathode and the anode of the zener diode DIC. The drain of the N-type transistor NTC is coupled to the power supply node NVI, and the gate thereof is coupled to a node between the resistors RC1, RC2. The resistors RC1, RC2 divide the voltage between the cathode of the zener diode DIC and the source power supply voltage VRL, and the divisional voltage is input to the gate of the N-type transistor NTC. Thus, the source voltage of the N-type transistor NTC becomes a voltage lower than the divisional voltage as much as the threshold voltage of the N-type transistor NTC, and that voltage is output as the gate power supply voltage VRH. A voltage-dividing ratio of the resistors RC1, RC2 is set so that the divisional voltage becomes around the voltage obtained by adding the source power supply voltage VRL, a predetermined voltage, and the threshold voltage to each other. Thus, the gate power supply voltage VRH becomes a voltage higher than the source power supply voltage VRL as much as the predetermined voltage.

Figure 10:
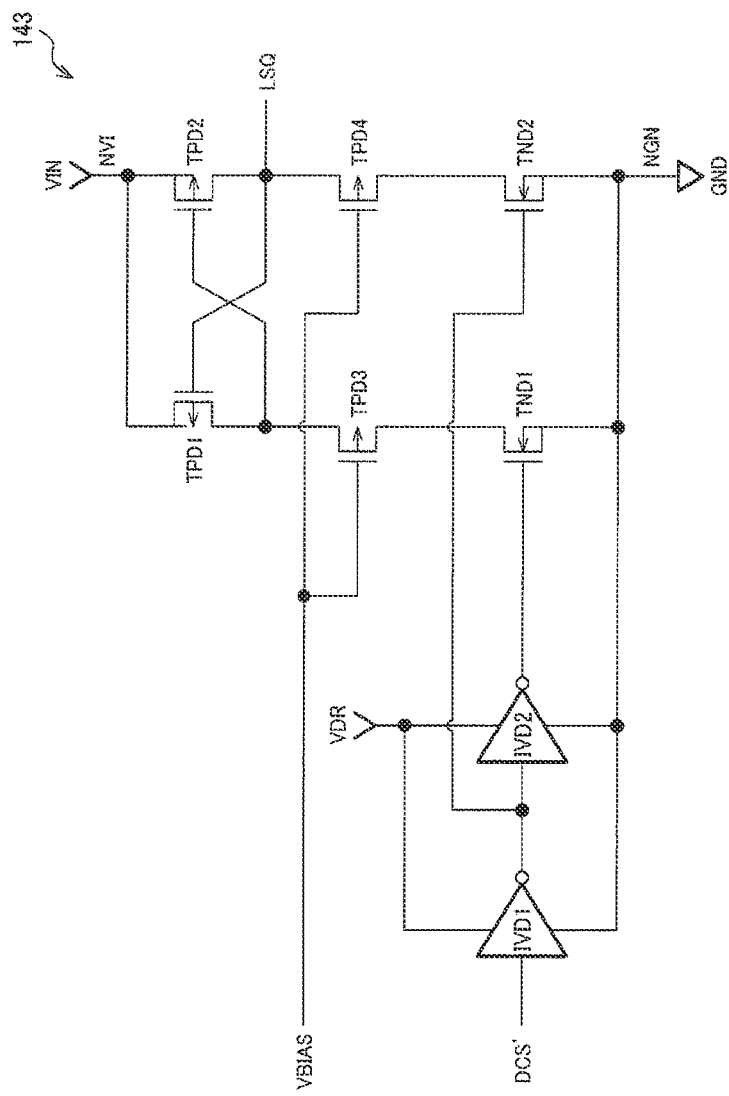
FIG. 10 is a diagram showing a detailed configuration example of a level shifter.

FIG. 10 shows a detailed configuration example of the level shifter 143. The level shifter 143 includes inverters IVD1, IVD2, P-type transistors TPD1 through TPD4, and N-type transistors TND1, TND2.

The PWM signal DCS' is input to the inverter IVD1, and an output signal of the inverter IVD1 is input to the inverter IVD2.

The P-type transistor TPD1, the P-type transistor TPD3, and the N-type transistor TND1 are coupled in series between the power supply node NVI and the ground node NGN. The P-type transistor TPD2, the P-type transistor TPD4, and the N-type transistor TND2 are coupled in series between the power supply node NVI and the ground node NGN. The gate of the P-type transistor TPD1 is coupled to the drain of the P-type transistor TPD2, and the gate of the P-type transistor TPD2 is coupled to the drain of the P-type transistor TPD1. The drain voltage of the P-type transistor TPD2 is output as the output signal LSQ of the level shifter 143. A bias voltage is input from a voltage generation circuit not shown to the gate of the P-type transistor TPD3 and the gate of the P-type transistor TPD4. An output signal of the inverter IVD2 is input to the gate of the N-type transistor TND1, and the output signal of the inverter IVD1 is input to the gate of the N-type transistor TND2.

When the PWM signal DCS' is at the high level, the P-type transistor TPD2 is in the ON state, and the N-type transistor TND2 is in the OFF state, and therefore, the output signal LSQ at the high level is output. When the PWM signal DCS' is at the low level, the P-type transistor TPD2 is in the OFF state, and the N-type transistor TND2 is in the ON state, and therefore, the output signal LSQ at the low level is output.

Figure 11:
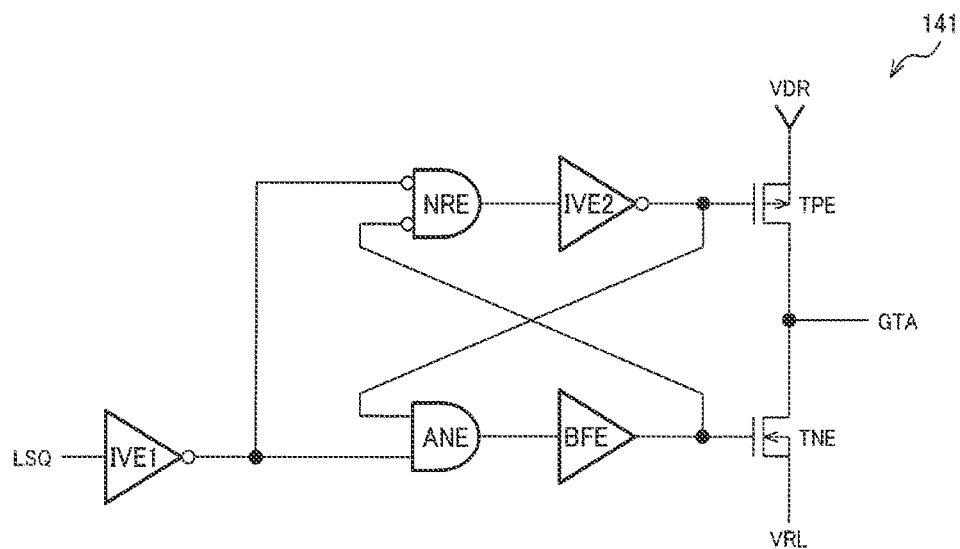
FIG. 11 is a diagram showing a detailed configuration example of a driver circuit.

FIG. 11 shows a detailed configuration example of the driver circuit 141. The driver circuit 141 includes inverters IVE1, IVE2, a NOR circuit NRE, an AND circuit ANE, a buffer BFE, a P-type transistor TPE, and an N-type transistor TNE.

The output signal LSQ of the level shifter 143 is input to the inverter IVE2. An output signal of the inverter IVE1 and an output signal of the buffer BFE are input to the NOR circuit NRE. An output signal of the NOR circuit NRE is input to the inverter IVE2. The output signal of the inverter IVE1 and an output signal of the inverter IVE2 are input to the AND circuit ANE. An output signal of the AND circuit ANE is input to the buffer BFE.

The P-type transistor TPE and the N-type transistor TNE are coupled in series between the node of the gate power supply voltage VRH and the node of the source power supply voltage VRL. The output signal of the inverter IVE2 is input to the gate of the P-type transistor TPE. The output signal of the buffer BFE is input to the gate of the N-type transistor TNE. The drive signal GTA is output from the source of the P-type transistor TPE and the source of the N-type transistor TNE.

When the output signal LSQ of the level shifter 143 is at the low level, the output signal of the inverter IVE2 is at the high level, and the output signal of the buffer BFE is at the high level, and therefore, the drive signal GTA at the low level is output. When the output signal LSQ of the level shifter 143 is at the high level, the output signal of the inverter IVE2 is at the low level, and the output signal of the buffer BFE is at the low level, and therefore, the drive signal GTA at the high level is output.

Figure 12:
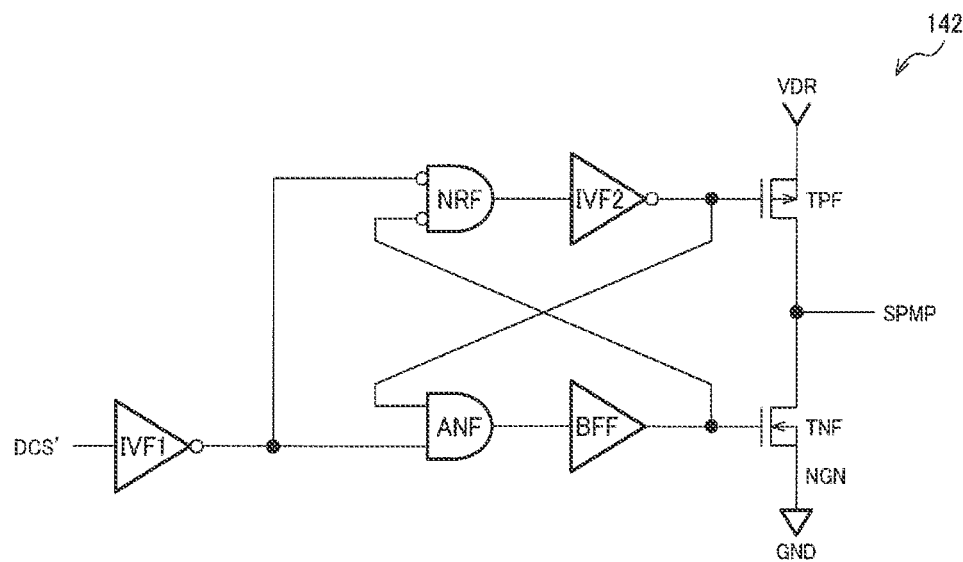
FIG. 12 is a diagram showing a detailed configuration example of a pumping driver circuit.

FIG. 12 shows a detailed configuration example of the pumping driver circuit 142. The pumping driver circuit 142 includes inverters IVF1, IVF2, a NOR circuit NRF, an AND circuit ANF, a buffer BFF, a P-type transistor TPF, and an N-type transistor TNF.

The PWM signal DCS' is input to the inverter IVF1. The P-type transistor TPF and the N-type transistor TNF are coupled in series between the node of the power supply voltage VDR and the ground node NGN. The pumping drive signal SPMP is output from the source of the P-type transistor TPF and the source of the N-type transistor TNF. The coupling relationship between the constituents and the circuit operation are substantially the same as those of the driver circuit 141 shown in FIG. 11.

It should be noted that the example in which the ON-duty of the switching element 11 is determined by the HIGH-duty of the PWM signal DCS' is described hereinabove, but it is possible to determine the ON-duty of the switching element 11 with the LOW-duty of the PWM signal DCS'. For example, the inverter IVE1 shown in FIG. 11 and the inverter IVF1 shown in FIG. 12 can be omitted.

In the first detailed configuration example, the third detailed configuration example, and the fourth detailed configuration example, the drive circuit 110 includes the driver circuit 141. The driver circuit 141 buffers the output signal LSQ of the level shifter 143 to output the drive signal GTA.

According to the present embodiment, by the driver circuit 141 buffering the output signal LSQ of the level shifter 143, it is possible to drive the gate of the switching element 11 with higher drive power than the drive power of the level shifter 143.

Further, in the second through fourth detailed configuration examples, the drive circuit 110 includes the pumping driver circuit 142. The pumping driver circuit 142 outputs the pumping drive signal SPMP obtained by buffering the PWM signal DCS' to the other end of the capacitor 18. The one end of the capacitor 18 is coupled to the gate of the transistor as the switching element 11.

According to the present embodiment, it is possible for the pumping driver circuit 142 to perform the pumping of the gate of the switching element 11 via the capacitor 18. Thus, the gate voltage waveform of the switching element 11 changes steeply compared to when driving the gate of the switching element 11 with the level shifter 143 or the driver circuit 141 without disposing the pumping driver circuit 142.

Further, in the present embodiment, the integrated circuit device 100 includes the regulator 132 as the second regulator. The regulator 132 generates the power supply voltage VDR based on the ground voltage GND. The power supply voltage VDR is lower than the source power supply voltage VRL. The pumping driver circuit 142 outputs the pumping drive signal SPMP to the other end of the capacitor 18 based on the power supply voltage VDR and the ground voltage GND.

According to the present embodiment, since the pumping drive signal SPMP is AC-coupled by the capacitor 18, it is possible for the pumping driver circuit 142 to operate with a power supply system based on the ground voltage GND. As described above, since the voltage of the drive signal GTA is a relatively high voltage, the lower the drive power of the drive signal GTA the more preferable taking malfunction or breakage due to, for example, short circuit into consideration. In this regard, by disposing the pumping driver circuit 142 operating with the relatively low voltage, it is possible to decrease the drive power of the drive signal GTA.

Further, in the present embodiment, the drive circuit 110 includes the resistance 145. The resistance 145 is disposed between the source and the gate of the transistor as the switching element 11.

According to the present embodiment, since it is possible to drive the gate of the switching element 11 without the AC coupling, the gate-source voltage of the switching element 11 is prevented from decreasing even when the resistor 145 is disposed between the source and the gate of the switching element 11. Thus, it becomes possible to omit such an external component group 19 of the light source circuit 17 as described with reference to FIG. 1.

Further, in the present embodiment, the drive circuit 110 includes the buffer amplifier circuit 144. The buffer amplifier circuit 144 outputs the source power supply voltage VRL obtained by buffering the source voltage of the transistor as the switching element 11 to the regulator 131.

The consumption current with respect to the gate power supply voltage VRH flows from the regulator 131 to the node of the source power supply voltage VRL. According to the present embodiment, since the buffer amplifier circuit 144 absorbs that current, that current does not flow through the inductor 14 in the light source circuit 17. Thus, the consumption current with respect to the gate power supply voltage VRH does not affect the light emission control.

Figure 13:
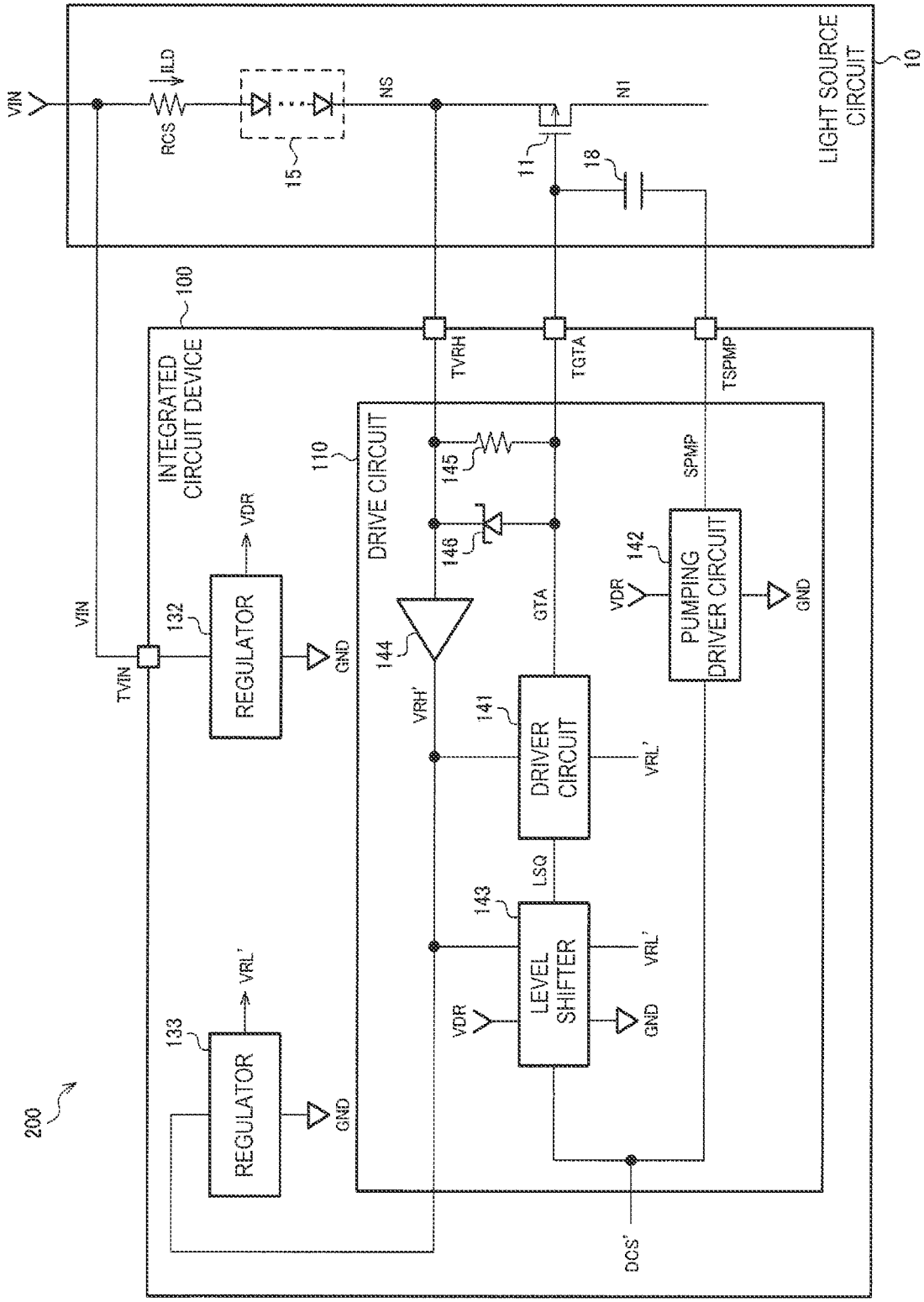
FIG. 13 is a diagram showing a detailed configuration example of the light source device when a switching element is a P-type transistor.

4. Detailed Configuration Example when Using P-Type Transistor as Switching Element FIG. 13 shows a detailed configuration example of the light source device 200 when the switching element 11 is a P-type transistor. It should be noted that although some of the constituents shown in FIG. 2 are omitted in FIG. 13, those constituents are substantially the same as those shown in FIG. 2. Portions different from those in FIG. 2 or FIG. 7 will hereinafter be described.

In the light source circuit 10, a node to which the cathode of the light emitting element 15 is coupled is defined as a node NS. The source of the P-type transistor as the switching element 11 is coupled to the node NS, and the drain thereof is coupled to the first node N1.

The integrated circuit device 100 includes a terminal TVRH instead of the terminal TVRL, and includes a regulator 133 instead of the regulator 131. The terminal TVRH is coupled to the node NS without being AC-coupled, and the source voltage of the switching element 11 is input to the terminal TVRH. The buffer amplifier circuit 144 buffers the source voltage of the switching element 11, and then outputs the voltage thus buffered to the regulator 133 as a source power supply voltage VRH'. The regulator 133 generates a gate power supply voltage VRL' a predetermined voltage lower than the source power supply voltage VRH' using the source power supply voltage VRH' and the input power supply voltage VIN.

The level shifter 143 receives the PWM signal DCS' to generate a signal the high level of which is the power supply voltage VDR, and the low level of which is the ground voltage GND, and then level-shifts the signal into the output signal LSQ the high level of which is the source power supply voltage VRH', and the low level of which is the gate power supply voltage VRL'. The driver circuit 141 operates using the gate power supply voltage VRL' and the source power supply voltage VRH' as power supply voltages. The driver circuit 141 buffers the output signal LSQ, and then outputs the drive signal GTA thus buffered to the gate of the switching element 11 via the terminal TGTA.

It should be noted that similarly to the first detailed configuration example, the second detailed configuration example, or the fourth detailed configuration example, it is possible to omit the driver circuit 141, it is possible to omit the pumping driver circuit 142 and the capacitor 18, or it is possible to omit the buffer amplifier circuit 144.

Figure 14:
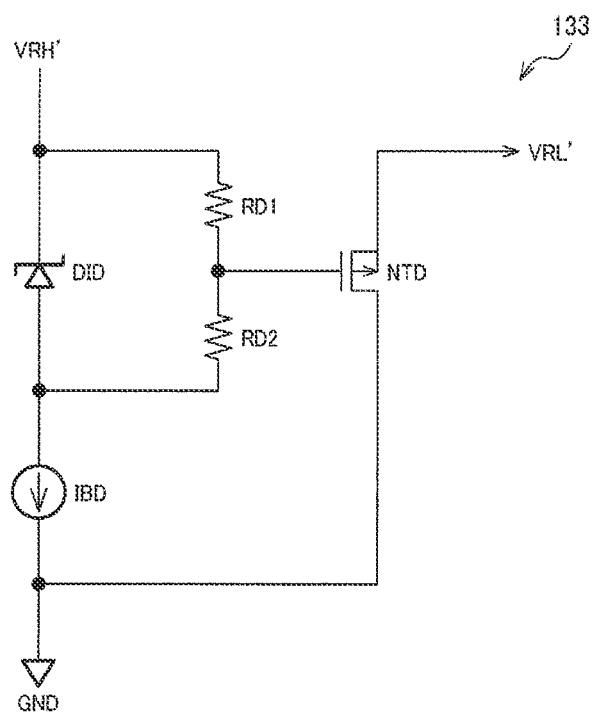
FIG. 14 is a diagram showing a detailed configuration example of a regulator.

FIG. 14 shows a detailed configuration example of the regulator 133. The regulator 133 includes a current source circuit IBD, a zener diode DID, resistors RD1, RD2, and a P-type transistor NTD.

The current source circuit IBD is disposed between the anode of the zener diode DID and the ground node. The cathode of the zener diode DID is coupled to a node of the source power supply voltage VRH'. By the current source circuit IBD making a current flow from the cathode to the anode of the zener diode DID, the anode of the zener diode DID is set to a voltage dropped as much as the zener voltage from the source power supply voltage VRH'.

The resistors RD1, RD2 are coupled in series between the cathode and the anode of the zener diode DID. The drain of the P-type transistor NTD is coupled to the ground node, and the gate thereof is coupled to a node between the resistors RD1, RD2. The resistors RD1, RD2 divide the voltage between the anode of the zener diode DID and the source power supply voltage VRH', and the divisional voltage is input to the gate of the P-type transistor NTD. Thus, the source voltage of the P-type transistor NTD becomes a voltage higher than the divisional voltage as much as the threshold voltage of the P-type transistor NTD, and that voltage is output as the gate power supply voltage VRL'. A voltage-dividing ratio of the resistors RD1, RD2 is set so that the divisional voltage becomes around the voltage obtained by subtracting a predetermined voltage and the threshold voltage from the source power supply voltage VRH'. Thus, the gate power supply voltage VRL' becomes a voltage lower than the source power supply voltage VRH' as much as the predetermined voltage.

The integrated circuit device according to the present embodiment described hereinabove controls a switching element. The switching element is disposed at a cathode side of a light emitting element in series with the light emitting element between a power supply node and one end of an inductor. The integrated circuit device includes a drive circuit and a regulator. The drive circuit outputs a drive signal to the switching element, and sets the drive signal to an active state to thereby set the switching element to an ON state, and sets the drive signal to an inactive state to thereby set the switching element to an OFF state. A source power supply voltage the same in potential as a source voltage of a transistor as the switching element is input to the regulator, and the regulator generates a gate power supply voltage based on the source power supply voltage. The drive circuit has a level shifter configured to level-shift a PWM signal based on the gate power supply voltage and the source power supply voltage, and outputs the drive signal based on an output signal of the level shifter to a gate of the transistor.

According to the present embodiment, the low level of the drive signal to be input to the gate of the switching element becomes the source power supply voltage, and the high level thereof becomes the gate power supply voltage based on the source power supply voltage. Thus, the switching element is appropriately controlled between ON and OFF even when inputting the drive signal to the gate of the switching element without the AC coupling. In other words, since it becomes unnecessary to dispose the external components for appropriately controlling the switching element between ON and OFF, it becomes possible to achieve both of the reduction of the external components and the appropriate control of the switching element.

Further, in the present embodiment, the drive circuit may include a driver circuit. The driver circuit may buffer an output signal of the level shifter to output the drive signal.

According to the present embodiment, by the driver circuit buffering the output signal of the level shifter, it is possible to drive the gate of the switching element with higher drive power than the drive power of the level shifter.

Further, in the present embodiment, the drive circuit may include a pumping driver circuit. The pumping driver circuit may output a pumping drive signal obtained by buffering the PWM signal to another end of a capacitor one end of which is coupled to the gate of the transistor.

According to the present embodiment, it is possible for the pumping driver circuit to perform pumping of the gate of the switching element via the capacitor. Thus, the gate voltage waveform of the switching element changes steeply compared to when driving the gate of the switching element with the level shifter or the driver circuit without disposing the pumping driver circuit.

Further, in the present embodiment, defining the regulator as a first regulator, the integrated circuit device may include a second regulator. The second regulator may generate a power supply voltage lower than the source power supply voltage based on a ground voltage. The pumping driver circuit may output a pumping drive signal to another end of the capacitor based on the power supply voltage and the ground voltage.

According to the present embodiment, since the pumping drive signal is AC-coupled by the capacitor, it is possible for the pumping driver circuit to operate with a power supply system based on the ground voltage. Since the voltage of the drive signal is a relatively high voltage, the lower the drive power of the drive signal the more preferable taking malfunction or breakage due to, for example, short circuit into consideration. In this regard, by disposing the pumping driver circuit operating with the relatively low voltage, it is possible to decrease the drive power of the drive signal.

Further, in the present embodiment, the drive circuit may include a resistor disposed between a source and the gate of the transistor.

According to the present embodiment, since it is possible to drive the gate of the switching element without the AC coupling, the gate-source voltage of the switching element is prevented from decreasing even when the resistor is disposed between the source and the gate of the switching element. Thus, it becomes possible to achieve both of the reduction of the external components of the light source circuit and the appropriate control of the switching element.

Further, in the present embodiment, the drive circuit may include a buffer amplifier circuit. The buffer amplifier circuit may output the source power supply voltage obtained by buffering the source voltage to the regulator.

A consumption current with respect to the gate power supply voltage flows from the regulator to a node of the source power supply voltage. According to the present embodiment, since the buffer amplifier circuit absorbs that current, that current does not flow through the inductor in the light source circuit. Thus, the consumption current with respect to the gate power supply voltage does not affect the light emission control.

Further, in the present embodiment, the integrated circuit device may include an analog dimming drive circuit. The analog dimming drive circuit may output an analog dimming drive signal to an analog dimming switching element. The analog dimming switching element controls a current flowing from another end of the inductor to a ground node. In a period in which the drive signal is in the active state, the analog dimming drive circuit sets the analog dimming drive signal to the active state to thereby set the analog dimming switching element to an ON state, and sets the analog dimming drive signal to the inactive state to thereby set the analog dimming switching element to an OFF state.

According to the present embodiment, it is possible to realize the analog dimming mode in which the dimming is performed using the switching regulation control of the analog dimming drive circuit, and the PWM dimming mode in which the dimming is performed using the PWM drive of the drive circuit. In the analog dimming mode, or when the ON-duty is relatively long in the PWM dimming mode, the switching element is kept in the ON state for a long time. However, according to the present embodiment, since the gate-source voltage of the switching element does not lower, it becomes possible to achieve both of the reduction of the external components of the light source circuit and the appropriate control of the switching element.

Further, the light source device according to the present embodiment includes the integrated circuit device described in any one of the functional element according to any one of the sections described above, the light emitting element, the switching element, and the inductor.

It should be noted that although the present embodiment is hereinabove described in detail, it should easily be understood by those skilled in the art that it is possible to make a variety of modifications not substantially departing from the novel matters and the advantages of the present disclosure. Therefore, all of such modified examples should be included in the scope of the present disclosure. For example, a term described at least once with a different term having a broader sense or the same meaning in the specification or the accompanying drawings can be replaced with the different term in any part of the specification or the accompanying drawings. Further, all of the combinations of the present embodiment and the modified examples are also included in the scope of the present disclosure. Further, the configurations, the operations, and so on of the integrated circuit device, the light source circuit, the light source device, and so on are not limited to those described in the present embodiment, but can be implemented with a variety of modifications.

What is claimed is:

1. An integrated circuit device configured to control a switching element disposed at a cathode side of a light emitting element in series with the light emitting element between a power supply node and one end of an inductor, the integrated circuit device comprising:
   a drive circuit configured to output a drive signal to the switching element, and set the drive signal to an active state to thereby set the switching element to an ON state, and set the drive signal to an inactive state to thereby set the switching element to an OFF state; and
   a regulator to which a source power supply voltage same in potential as a source voltage of a transistor as the switching element is input, and which is configured to generate a gate power supply voltage based on the source power supply voltage, wherein
   the drive circuit has a level shifter configured to level-shift a PWM signal based on the gate power supply voltage and the source power supply voltage, and outputs the drive signal based on an output signal of the level shifter to a gate of the transistor.

2. The integrated circuit device according to claim 1, wherein
   the drive circuit includes a driver circuit which is configured to buffer the output signal of the level shifter to output the drive signal.

3. The integrated circuit device according to claim 1, wherein
   the drive circuit includes a pumping driver circuit configured to output a pumping drive signal obtained by buffering the PWM signal to another end of a capacitor one end of which is coupled to the gate of the transistor.

4. The integrated circuit device according to claim 3 further comprising:
   a second regulator configured to generate a power supply voltage lower than the source power supply voltage based on a ground voltage when defining the regulator as a first regulator, wherein
   the pumping driver circuit outputs the pumping drive signal to the another end of the capacitor based on the power supply voltage and the ground voltage.

5. The integrated circuit device according to claim 1, wherein
   the drive circuit includes a resistor disposed between a source and the gate of the transistor.

6. The integrated circuit device according to claim 1, wherein
   the drive circuit includes a buffer amplifier circuit configured to output the source power supply voltage obtained by buffering the source voltage to the regulator.

7. The integrated circuit device according to claim 1 further comprising:
   an analog dimming drive circuit which is configured to output an analog dimming drive signal to an analog dimming switching element configured to control a current flowing from another end of the inductor to a ground node, set the analog dimming drive signal to an active state to thereby set the analog dimming switching element to an ON state, and set the analog dimming drive signal to an inactive state to thereby set the analog dimming switching element to an OFF state in a period in which the drive signal is in the active state.

8. A light source device comprising:
   the integrated circuit device according to claim 1;
   the light emitting element;
   the switching element; and
   the inductor.

* * * * *